United States Patent [19]
Ernst

[11] 3,990,519
[45] Nov. 9, 1976

[54] PLANT PULLING APPARATUS

[76] Inventor: Arnold E. Ernst, Wolverton, Minn. 56594

[22] Filed: Apr. 16, 1975

[21] Appl. No.: 568,697

[52] U.S. Cl.................................. 171/58; 56/13.9; 56/15.1; 56/63; 171/40
[51] Int. Cl.² ....................................... A01D 25/04
[58] Field of Search.................. 56/13.5, 14.9, 15.1, 56/15.7, 51, 53, 63, 12.3, 121.44, 121.45, 121.46, DIG. 14; 171/28, 40, 55, 58

[56] References Cited
UNITED STATES PATENTS

| | | | |
|---|---|---|---|
| 966,470 | 8/1910 | Phillip et al............................ | 171/58 |
| 2,645,890 | 7/1953 | Spedding .............................. | 56/15.1 |
| 2,660,013 | 11/1953 | Priestley ................................ | 171/58 |
| 3,306,017 | 2/1967 | Wells .................................. | 171/40 X |
| 3,426,515 | 2/1969 | Boyer................................... | 171/58 X |
| 3,437,152 | 4/1969 | Barrentine ........................ | 56/13.5 X |
| 3,524,306 | 8/1970 | Reber .................................. | 56/12.3 |
| 3,733,795 | 5/1973 | Rabb et al. ........................ | 56/121.45 |

*Primary Examiner*—J.N. Eskovitz
*Attorney, Agent, or Firm*—Henderson, Strom & Sturm

[57] ABSTRACT

A frame having weed pulling apparatus attached thereto is adapted to be attached to a tractor hitch for lifting or lowering the frame. Pairs of pneumatic tires are rotatably mounted along substantially parallel axes. Each of the pneumatic tires has an axle with a sprocket affixed thereto. A chain is arranged to be disposed over a first sprocket and under the next adjacent sprocket, and so forth, for each adjacent sprocket such that each adjacent sprocket and thereby each adjacent wheel will rotate in an opposite direction. A chain lubricating structure is also attached to the frame. Weed guiding mechanisms are provided to prevent pulled plants from being deposited on top of the frame. Two wheels are pivotally attached to the frame in association with hydraulic cylinders. These wheels act as gauge wheels for maintaining the weed pulling apparatus at a desired distance above the ground when in operation, and these wheels also act as transport wheels for moving the weed pulling apparatus to and from the places where it is to be used.

8 Claims, 9 Drawing Figures

PLANT PULLING APPARATUS

BACKGROUND OF THE INVENTION

The present invention relates generally to a plant pulling apparatus and more particularly to an apparatus for pulling weeds from sugar beet plants.

Various types of machines have been devised to grasp a plant and pull it from the ground, or pull at least a portion of the plant from the main plant itself. Plant pulling machines of this general type can be seen in U.S. Pat. No. 1,538,829 issued to Larson in 1925, U.S. Pat. No. 2,397,249 issued to Dostal in 1946, U.S. Pat. No. 2,648,185 issued to Dahlman in 1953 and U.S. Pat. No. 3,833,065 issued to Hamminga in 1974. Notwithstanding the fact that there have been numerous plant pulling devices, many of which have been patented, still the most prevalent method in use today for removing weeds from sugar beets is to hire large numbers of laborers to walk down the sugar beet rows and pull the weeds by hand. Apparently, manual labor is more effective, dependable and perhaps cheaper to use than the machines shown in the prior art, at least those which require many special and separate motors, belts or chains which move in various directions to produce somewhat complicated machines.

SUMMARY

The present invention relates to a plant pulling apparatus which traps plants between abutting portions of the periphery of a pair of pneumatic tires which are in close proximity, and which tires are rotating in opposite directions whereby the plant which is between the tires is pulled. A chain lubricating structure is provided in association with an arrangement for rotating adjacent pneumatic tires in opposite directions. Weed guiding structure on the plant pulling apparatus is provided for directing plants upwardly and rearwardly so that they are not deposited on the frame or on any of the moving parts of the plant pulling apparatus. Wheel mechanisms are provided in association with the plant pulling apparatus which serve to maintain the plant pulling apparatus at a desired level above the ground when in operation while still allowing the three-point hitch of a tractor to be operable to lift up the plant pulling apparatus so that the operator thereof can turn the tractor and plant pulling apparatus around at the end of a field, and furthermore wherein the wheel mechanism is movable to another position such that the wheel mechanism maintains the plant pulling apparatus off of the ground so that the wheels then serve a transporting function for the plant pulling apparatus.

An object of the present invention is to provide a dependable apparatus for pulling plants and especially for pulling weeds around sugar beet plants without pulling the beets themselves.

Another object of the invention is to provide a mechanism for rotating a pneumatic tire type of weed pulling apparatus in a simple and economical way.

A further object of the invention is to provide a chain lubricating device for a weed pulling apparatus.

Still another object is to provide a device for preventing pulled weeds or plants from being deposited on the frame of a weed pulling apparatus.

Still further, another object of the invention is to provide a structure for maintaining the weed pulling apparatus a desired distance above the ground while in operation and yet providing for a transport position and turnaround position which is convenient to the operator of a plant pulling apparatus.

Other objects, advantages, and novel features of the present invention will become apparent from the following detailed description of the invention when considered in conjunction with the accompanying drawings.

DESCRIPTION OF THE PREFERRED EMBODIMENT

Figure 1:
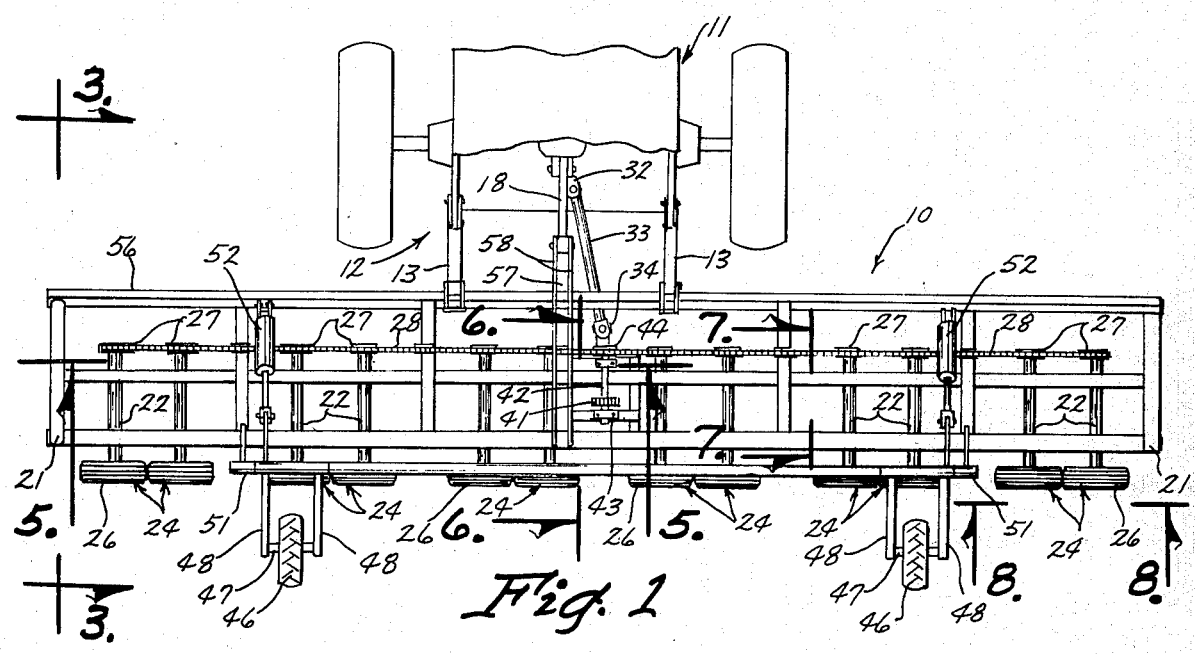
FIG. 1 is a plan view of the plant pulling apparatus of the present invention shown connected to an agricultural tractor.
Figure 2:
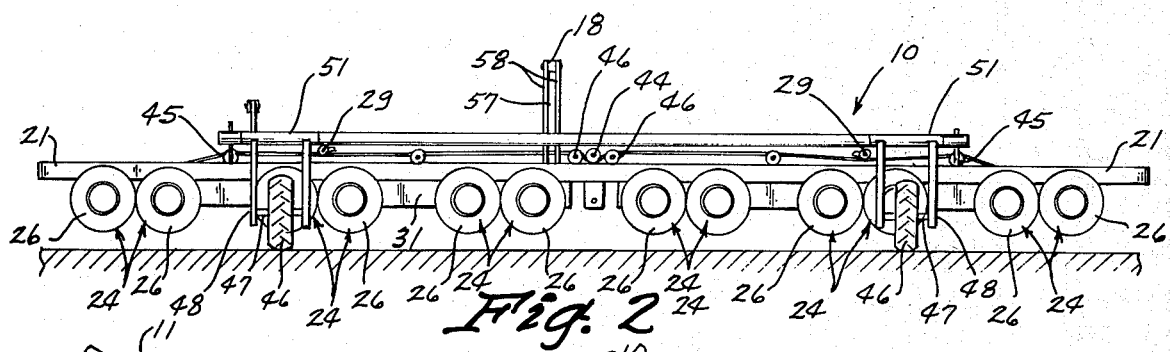
FIG. 2 is a rear view of the plant pulling apparatus of the present invention.
Figure 3:
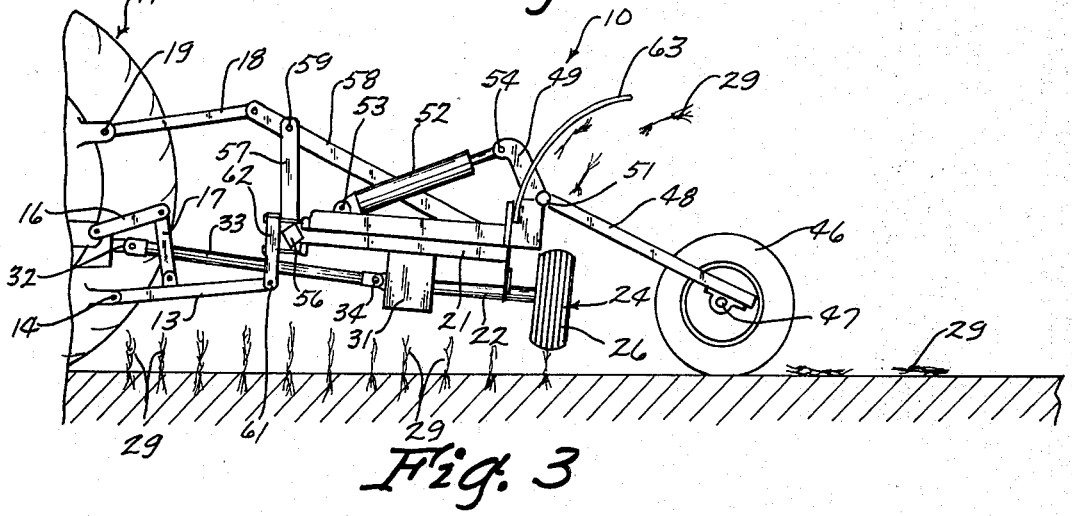
FIG. 3 is a side view of the plant pulling apparatus of the present invention in an operational position for the purpose of pulling weeds from sugar beets.

Referring now to the drawings wherein like reference numerals designate identical or corresponding parts throughout the several views, FIG. 1 shows the plant pulling apparatus 10 of the present invention shown connected to an agricultural tractor 11 through a three-point hitch arrangement 12. The three-point hitch arrangement 12 has a pair of draft arms 13 which pivot about a horizontal axis 14 (FIG. 3). This pivoting movement of the draft arm 13 is controlled by conventional hydraulic structure including the linkage members 16 and 17 which are pivotally attached at the ends thereof. An upper rod 18 is also shown pivotally attached at point 19 to the tractor 11 (FIG. 3).

The plant pulling apparatus 10 includes a frame 21 to which the other parts of the plant pulling apparatus are attached. A series of shaft housings 22 are rigidly affixed to the frame such as by welding. Within each of the shaft housings 22 is contained a shaft 23 which is mounted therein. Within each end of the shaft housing 22 there is contained bearing members (not shown) for allowing substantially friction free movement of the shaft 23 within the shaft housing 22.

Figure 5:
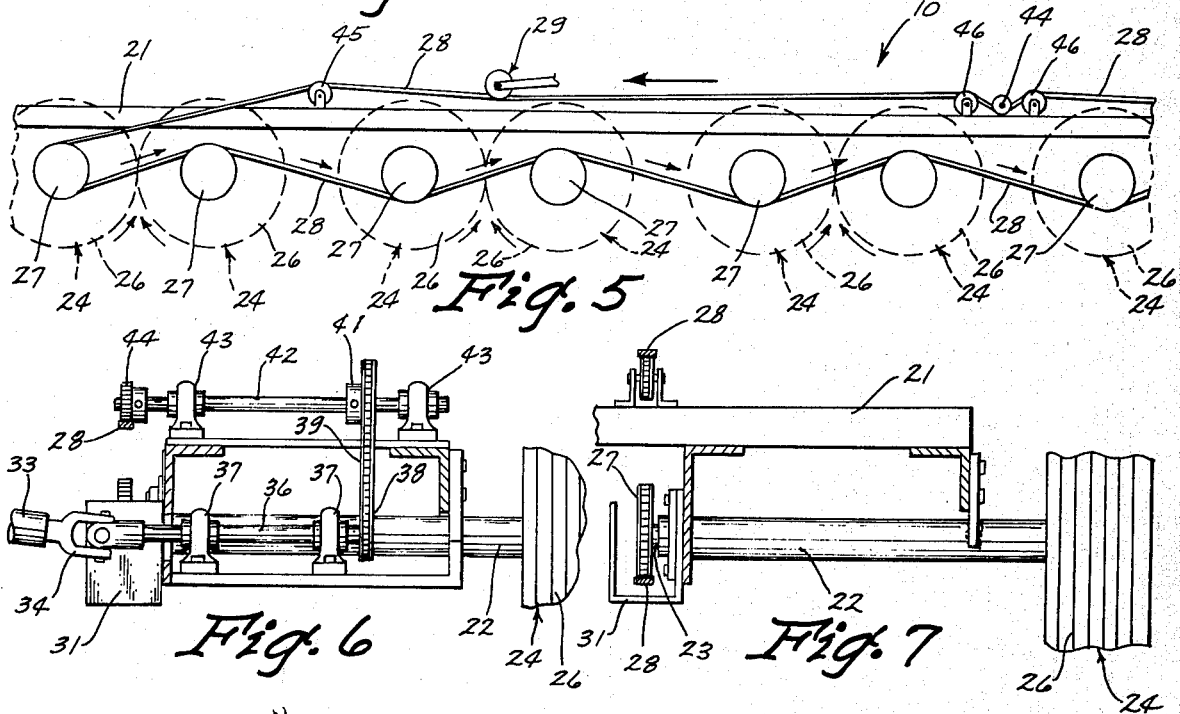
FIG. 5 is a partial cross-sectional view of the present invention taken along line 5-5 of FIG. 1.
Figure 8:
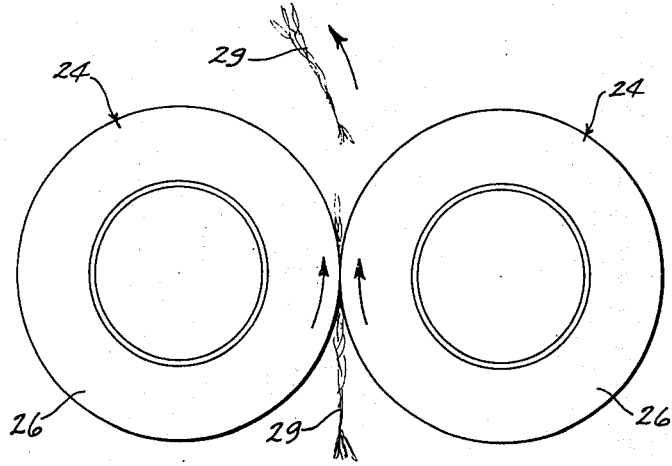
FIG. 8 is a partial rear view of a pair of the pneumatic tires of the present invention in operation for example as shown also in FIG. 3.

On one end of each of the shafts 23 is a wheel 24 having a pneumatic tire 26 thereon. This pneumatic tire contains a low amount of air pressure as compared to what would be used in the tire of a normal vehicle such as an automobile. On the other end of each shaft 23 is disposed a circular sprocket 27. An endless chain 28 engages each of the sprockets 27 and thereby drives the associated shaft 23 and wheel 24. Referring to FIG. 5 it can be seen that the chain 28 passes around the left most sprocket 27 over the top of the next adjacent sprocket 27, under the next adjacent sprocket 27, over the next adjacent sprocket 27, etc. The reason for this particular arrangement of the chain 28 is so that each adjacent sprocket member 27 will be driven in opposite directions. This arrangement is important especially for those pairs of sprockets which are closest together. The purpose of such arrangement is so that the adjacent wheels 24 of the weed pulling apparatus 10 which are adjacent will rotate in opposite directions, for example as shown in FIG. 8. Because of this particular relative rotation of wheels 24, a weed 29 will be pulled upwardly and thrown out over the top of the wheels 24 as can be clearly seen in FIGS. 3 and 8.

The chain 28 has associated therewith a chain tightener 29 of well known construction (FIG. 5). The chain 28 and the sprockets 27 are disposed in an elongated oil pan 31 which can be seen clearly in FIGS. 6 and 7, for example.

Figure 6:
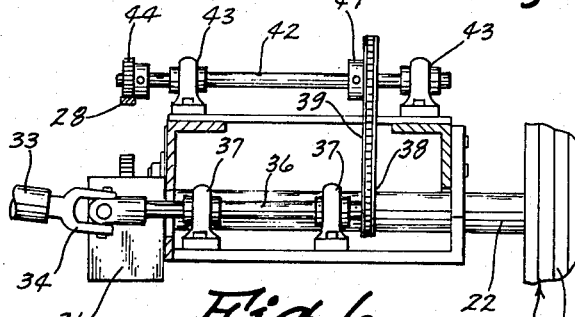
FIG. 6 is a partial cross-sectional view of the present invention taken along line 6-6 of FIG. 1.
Figure 7:
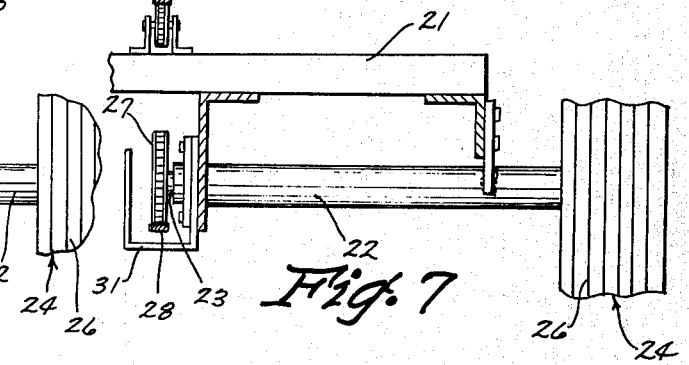
FIG. 7 is a partial cross-sectional view taken along line 7—7 of FIG. 1.

The chain 28 is driven from the power take off shaft 32 through a drive power transmitting linkage 33 to a universal joint 34 (FIG. 6). The universal joint 34 is connected to a shaft 36 which is rotatably mounted in a pair of bearings 37. This shaft 36 has a sprocket 38 on one end thereof and this sprocket 38 has a chain 39 disposed therearound. This chain 39 is also disposed around another sprocket 41 (FIG. 6), which sprocket 41 is secured to another rod 42. The rod 42 is mounted within a pair of bearings 43 which are secured to the frame 21. Another sprocket member 44 is secured to one end of the shaft 42 and this sprocket 44 is in contact with the chain 28. A pair of pulley members 46 (FIG. 5) insure that the chain 28 maintains a non-slipping relationship with respect to the sprocket member 44. Consequently, when the power take off 32 is engaged such that it rotates, this rotation is transmitted to the drive linkage 32 through the universal joint 34, through the shaft 36 to the sprocket 38. This rotation of the sprocket 38 (FIG. 6) is transmitted to the chain 39 which further transmits this rotating motion to the sprocket 41 affixed to the shaft 42. The rotation of the shaft 42 is transmitted to the sprocket member 44 which is the sprocket which drives the chain 28 in the direction as shown in FIG. 5.

A pair of ground engagable wheels 46 (FIGS. 1–4) are rotatably mounted through a shaft 47 to levers 48. These levers 48 are rigidly affixed to the levers 49, and both of the rigidly connected levers 48 and 49 are pivotally attached to the frame 21 at the pivot 51. Hydraulic cylinders 52 are pivotally attached at one end to the frame 21 at a pivotal point 53 and they are pivotally attached at the other end thereof to the levers 49 at a pivotal point 54. A tool bar 56 (FIGS. 3 and 4) has an upstanding post member 57 rigidly affixed thereto. Rods 58 are also pivotally attached to the frame 21 at the rear end thereof, to the rod 18 at the other end thereof and rods 58 are also pivotally attached intermediate the ends thereof at the pivotal point 59. It will be clearly understood to those skilled in this art that when the draft arms 13 of the tractor 11 are raised that the entire frame 21 and the weed pulling structure 10, in general, pivots about the pivotal point 61 which is attached to the draft arms 13 of the tractor and to an appendage 62 of the tool bar 56. The linkage structure, including the arms 18, 57 and 58, serves to push the rear end of the frame 22 downwardly in the lowered operative position thereof, and raises the rear end of the frame 21 and thereby the weed pulling device 10 upwardly in the raised turning position thereof (FIG. 4).

Figure 9:
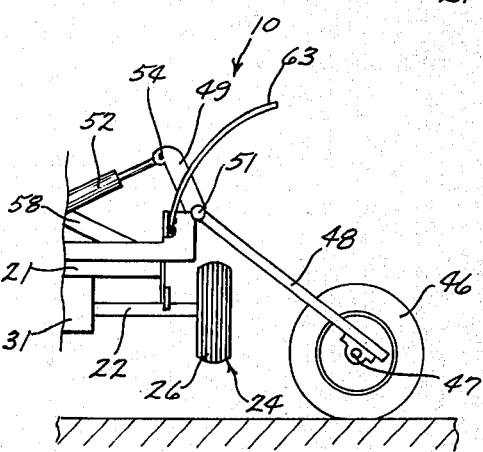
FIG. 9 is a side view of the present invention similar to FIGS. 3 and 4 but showing the plant pulling apparatus in a transport position.

In operation, the operator would move an appropriate control for the hydraulic cylinders 52 to lengthen the effective length of these cylinders 52 to a position as shown in FIG. 9, whereby the ground engagable wheel 46 holds up the entire weed pulling apparatus 10. The weed pulling apparatus 10 is then transported to the place where there are plants or weeds to be pulled. When it is desired that the weeds be pulled, the hydraulic cylinders 52 are moved to the position as shown in FIG. 3 to adjust the weed pulling wheels 24 to the proper and desired heights above the ground. The power take off 32 is then engaged such that this will ultimately begin to move the chain 28 as shown in FIG. 5 to thereby rotate each of the weed pulling wheels 24 also as shown in FIG. 5. The weeds 29 will then be grasped between the pairs of wheels 24 which engage one another, and the speed of the wheels will be such as to throw the weeds upwardly as shown in FIGS. 3 and 8. A weed directing guard member 63 is optionally shown in FIGS. 3 and 4 for example. This weed directing guard member 63 prevents the weeds 29 from dropping back down on the wheels 24 or back on the moving parts of the weed pulling apparatus 10.

Figure 4:
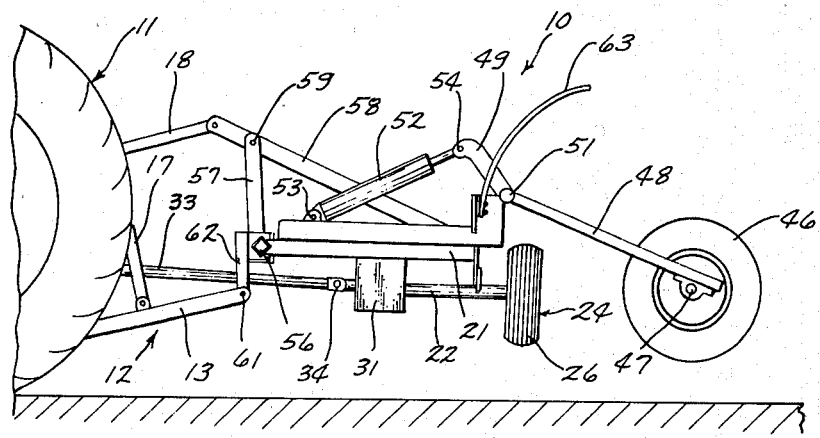
FIG. 4 is a side view of the present invention similar to FIG. 3 but showing a corner turning position of the present invention.

When it is desired to turn a corner, for example, as when the operator would come to the end of a field and desired to turn around and go back in the opposite direction, the three-point hitch 12 of the tractor 11 would be raised to the position as shown in FIG. 4. Once the turn is made then the three-point hitch 12 would be lowered to the position as shown in FIG. 3 and the weed pulling device would continue to operate. While it is true that the FIG. 9 position of the weed pulling apparatus 10 and the ground engagable wheel 46 could be assumed in turning, it is much faster and much easier to use the three-point hitch mechanism for this purpose, especially since it is desired to leave the hydraulic cylinder at the set position such that the wheels 24 are still at the desired level above the ground automatically after turning a corner as shown in FIG. 3.

Once the weed pulling is finished, then the hydraulic cylinders 52 would be extended to the position as shown in FIG. 9 and the tractor would then transport the device 10 back back to its place of origin.

Accordingly, it can be seen that the present invention does indeed accomplish the objects set forth above. Obviously many modifications and variations of the present invention are possible in light of the above teachings. It is therefore to be understood that, within the scope of the appended claims, the invention may be practices otherwise than as specifically described.

I claim:

1. A plant pulling apparatus comprising:
    a frame connected to a tool bar adapted to be connected to a tractor lifting mechanism;
    a first shaft rotatably connected to said frame;
    a second shaft rotatably connected to said frame;
    a first wheel connected to said first shaft;
    a second wheel connected to said second shaft in close proximity to said first wheel;
    a first substantially circular drive member connected to said first shaft;
    a second substantially circular drive member connected to said second shaft;
    a continuous flexible drive line extending around and engaging one side of the first substantially circular drive member and extending around and engaging the opposite side of the second substantially circular drive member;

means for driving said continuous flexible drive line to thereby rotate said first drive member, first shaft and first wheel in one direction and the second drive member, second shaft and wheel in an opposite direction whereby plants between the first and second wheels are pulled out of the ground;

a lever being pivotally mounted along a horizontal axis to said frame;

a transport wheel being rotatable connected to one end of said lever;

means for pivoting said lever to thereby control the vertical position of said transport wheel with respect to said frame;

a post member being rigidly connected to said tool bar;

a rod being pivotally connected intermediate the ends thereof to said post, said rod being connected adjacent one end thereof to said frame rearwardly of said tool bar; and a second rod being adapted to be pivotally attached at one end thereof to a tractor and pivotally attached to the other end thereof to the other end of the first said rod.

2. A plant pulling apparatus as defined in claim 1 wherein said first and second substantially circular members are sprockets and said continuous flexible drive line comprises a chain.

3. A plant pulling apparatus as defined in claim 2 wherein said driving means comprises a linkage to a power take off of a tractor.

4. A plant pulling apparatus as defined in claim 2 wherein an elongated pan is attached to said frame for holding chain lubricating oil and a portion of said chain is disposed in said pan.

5. A plant pulling apparatus as defined in claim 1 wherein another set of shafts, wheels and drive members are operably connected to said frame.

6. A plant pulling apparatus as defined in claim 1 including means for maintaining said continuous flexible drive line in a taut condition.

7. A plant pulling apparatus as defined in claim 1 including shield means attached to said frame for preventing pulled plants from falling in front of said first and second wheels.

8. A plant pulling apparatus as defined in claim 1 wherein said first and second wheels have pneumatic tires thereon.

* * * * *